(12) United States Patent
Yu

(10) Patent No.: US 7,249,475 B2
(45) Date of Patent: Jul. 31, 2007

(54) PADLOCK

(75) Inventor: Chang-Chiang Yu, Taipei Hsien (TW)

(73) Assignee: Sinox Co., Ltd., Taipei Hsein (TW)

( * ) Notice: Subject to any disclaimer, the term of this patent is extended or adjusted under 35 U.S.C. 154(b) by 0 days.

(21) Appl. No.: 11/163,638

(22) Filed: Oct. 26, 2005

(65) Prior Publication Data

US 2006/0130539 A1    Jun. 22, 2006

(30) Foreign Application Priority Data

Dec. 21, 2004    (TW) ............................... 93220586 U

(51) Int. Cl.
  *E05B 37/02*    (2006.01)
(52) U.S. Cl. .............................. 70/18; 24/598.1; 70/22; 70/23; 70/28; 70/29; 70/53
(58) Field of Classification Search .................... 70/28, 70/22, 23, 18, 20, 27, 29, 43, 53; 24/598.1, 24/599.3, 600.9
  See application file for complete search history.

(56) References Cited

U.S. PATENT DOCUMENTS

| 89,826 | A | * | 5/1869 | Arnold | 70/28 |
|---|---|---|---|---|---|
| 93,501 | A | * | 8/1869 | Treat | 70/27 |
| 157,258 | A | * | 11/1874 | Willbur | 70/28 |
| 372,425 | A | * | 11/1887 | Meise | 70/28 |
| 601,519 | A | * | 3/1898 | Leighton | 70/28 |
| 901,972 | A | * | 10/1908 | Kone | 70/28 |
| 903,680 | A | * | 11/1908 | Cowie | 70/27 |
| 940,763 | A | * | 11/1909 | Whalen | 70/28 |
| 1,034,263 | A | * | 7/1912 | Lorey | 70/28 |
| 1,092,031 | A | * | 3/1914 | En Earl | 70/27 |
| 1,205,781 | A | * | 11/1916 | Pirog | 70/28 |
| 1,507,213 | A | * | 9/1924 | Singer et al. | 70/27 |
| 1,542,016 | A | * | 6/1925 | Stull | 70/24 |
| 1,712,476 | A | * | 5/1929 | Coiro | 70/28 |
| 4,682,481 | A | * | 7/1987 | Dimmick et al. | 70/14 |
| 6,415,634 | B2 | | 7/2002 | Luquire | |
| 2003/0066319 | A1 | * | 4/2003 | Huang | 70/28 |
| 2005/0076683 | A1 | * | 4/2005 | Chen | 70/28 |

\* cited by examiner

*Primary Examiner*—Lloyd A. Gall
(74) *Attorney, Agent, or Firm*—Birch, Stewart, Kolasch & Birch, LLP

(57) ABSTRACT

A padlock comprises a shackle having a first end and a second end and an arm, the arm being extendable along an axis of the arm. The arm further includes a locking mechanism having an axle pivotally connected to the second end and a plurality of tumblers sleeved into the axle, in which the axle defines an inner channel; and a movable connection component having a head and a shaft connected to the head, and when the locking mechanism is in a first position, the head is attached to the first end and when the locking mechanism is in a second position, only the movable connection component is movable along the axis of the arm and the head is detached from the first end.

6 Claims, 9 Drawing Sheets

PADLOCK

BACKGROUND OF THE INVENTION

1. Field of the Invention

The invention relates to a padlock, and more particularly, to a padlock having a shackle and a lock.

2. Description of the Prior Art

In the past, the conventional shackle has been secured and fixed in position by utilizing a spring or a screw. Unfortunately, this method is often ineffective because most people are able to easily unlock or remove the shackle. A locking mechanism needs to be installed to limit the accessibility of the shackle to a certain number of people.

U.S. Pat. No. 6,415,634 to Luquire, incorporated herein in its entirety by this reference, discloses a padlock adapted for one-handed operation. Typically having a laterally asymmetric shackle, the lock includes an arm connected thereto to pivot when the locking mechanism is disengaged. After the locking mechanism is disengaged, a spring or other component facilitates the latching of the device by biasing the arm toward an exposed end of the shackle. In addition to one end of the arm that is pivotally connected to the shackle, the other end of the arm includes a stop. Furthermore, the stop is received by a recess formed on the shackle and is utilized when the locking mechanism is in a closed position. Consequently, the structure surrounding the recess is unavoidably weakened as a result of the formation of the recess and thereby affecting the overall efficiency of the lock.

SUMMARY OF THE INVENTION

It is therefore an objective of the claimed invention to provide a padlock having an adapted shackle and locking mechanism.

According to the claimed invention, a padlock comprises a shackle having a first end and a second end and an arm, the arm being extendable along an axis of the arm. Preferably, the arm further includes a locking mechanism having an axle pivotally connected to the second end, and a plurality of tumblers sleeved into the axle, the axle defining an inner channel; and a movable connection component having a head and a shaft connected to the head, and when the locking mechanism is in a first position, the head is attached to the first end and when the locking mechanism is in a second position, only the movable connection component is movable along the axis of the arm and the head is detached from the first end.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
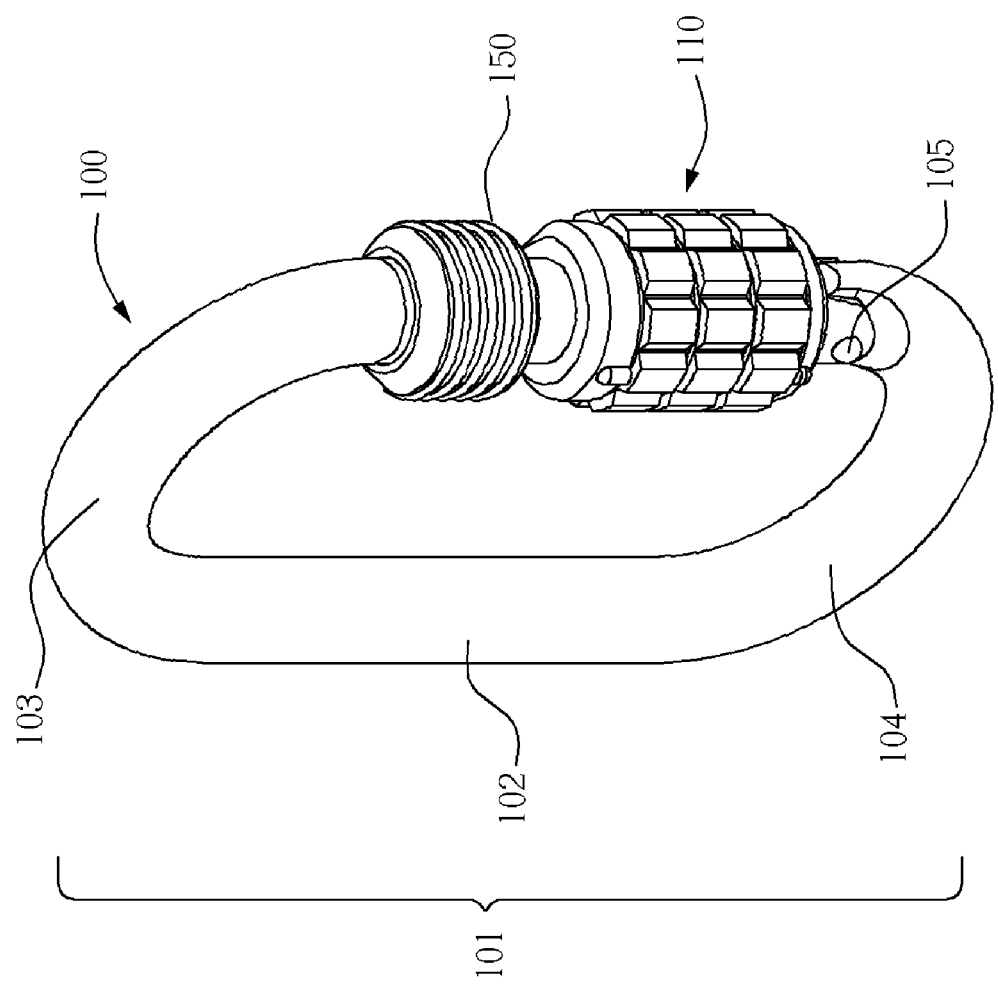
FIG. 1 and FIG. 2 are perspective diagrams showing the open and locking position of a padlock according to the present invention.
Figure 2:
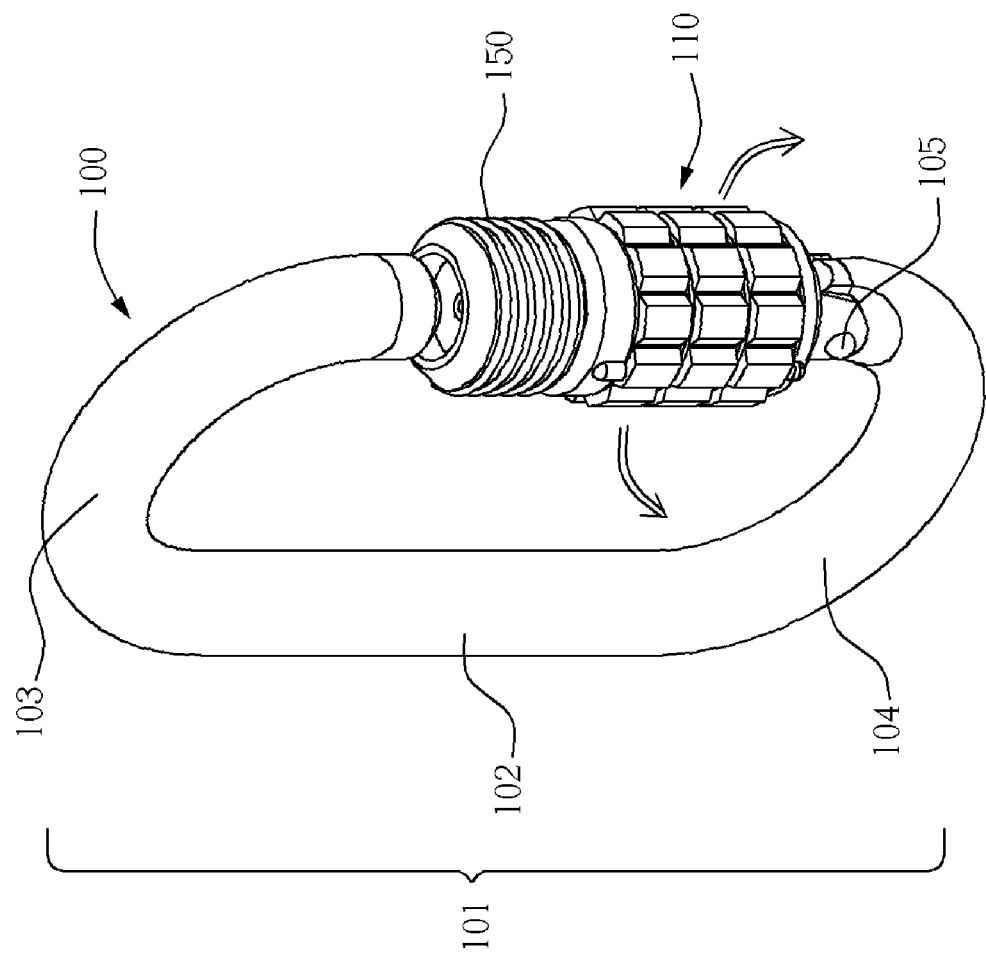

Please refer to FIG. 1 and FIG. 2. FIG. 1 and FIG. 2 are perspective diagrams showing the unlocked and locked position of a padlock according to the present invention. As shown in FIG. 1 and FIG. 2, a padlock 100 includes a shackle 101 and an arm 110, in which the shackle 101 further includes a first curved segment 103, a second curved segment 104, and a straight segment 102. Preferably, an opening is formed on the corresponding opposite side of the straight segment 102 by the first curved segment 103 and the second curved segment 104, in which the opening can be sealed by the connection of the arm 110 and a retractable movable connection component 150, thereby enclosing a closed interior space.

Figure 3:
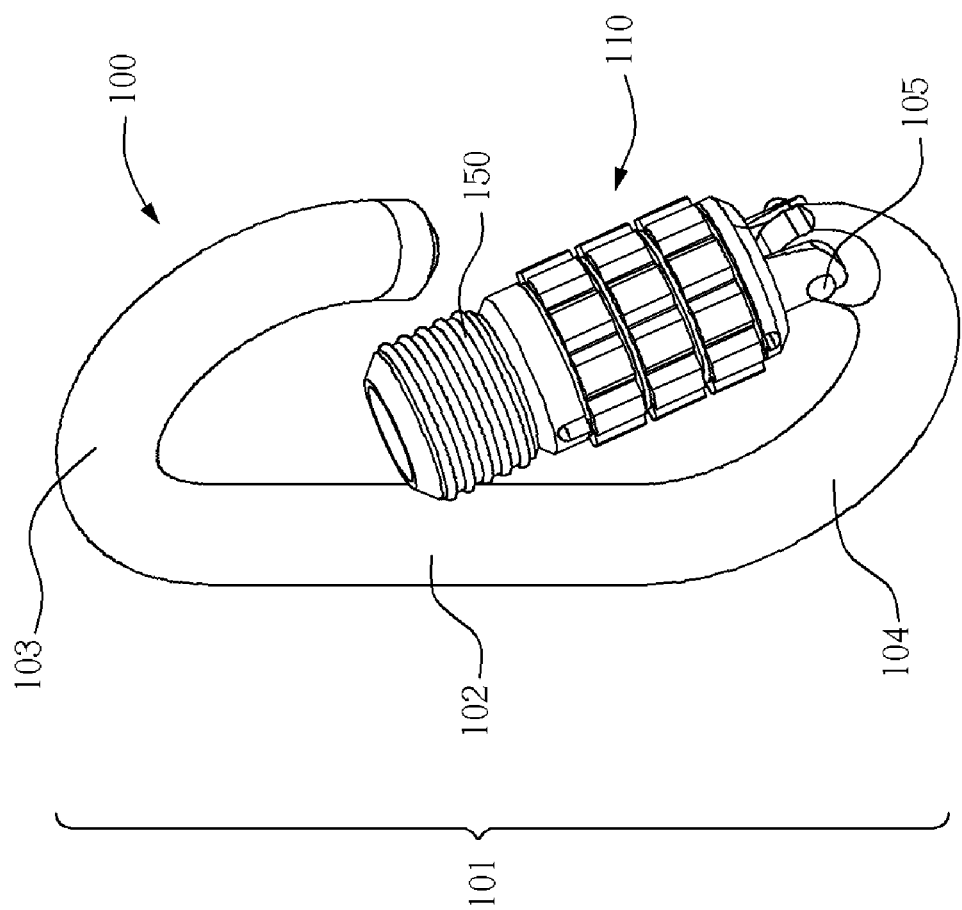
FIG. 3 and FIG. 4 are perspective diagrams showing the arm rotation of the padlock according to the present invention.
Figure 4:
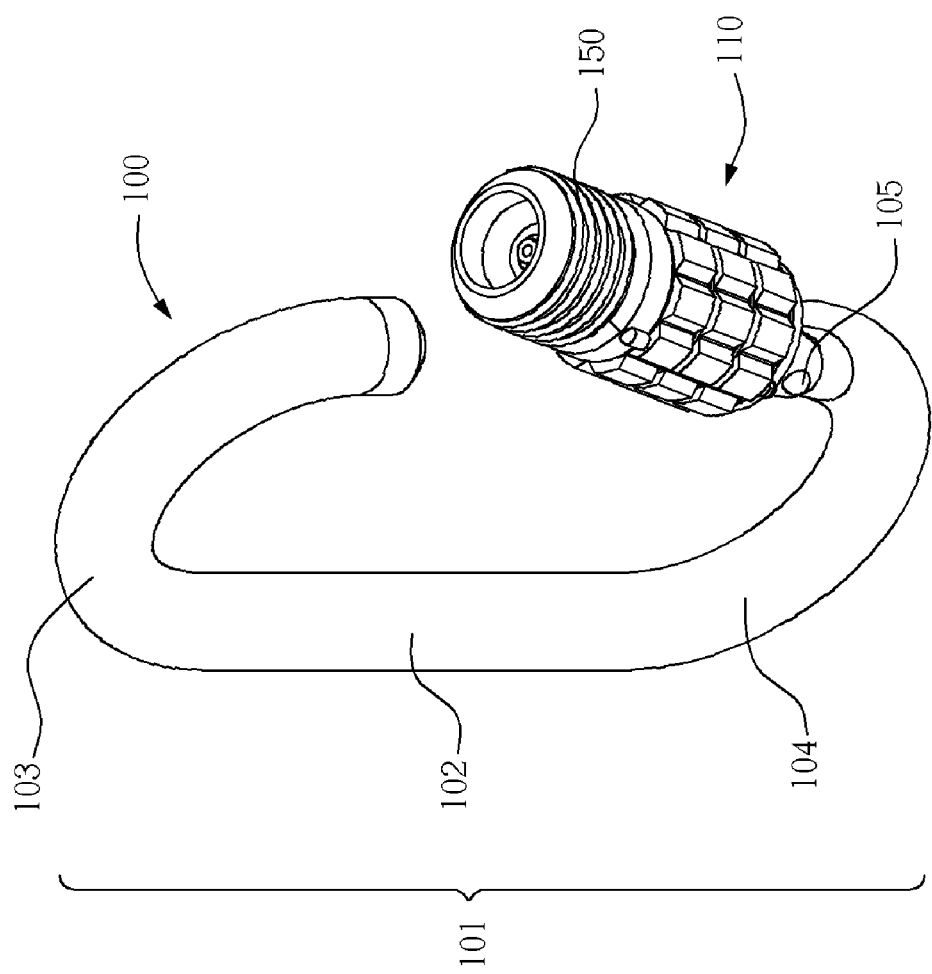

As shown in the figures, one end of the arm 110 is connected pivotally to the second curved segment 104 via a connective bolt 105 whereas the other end of the arm 110 is connected to the first curved segment 103 via the movable connection component 150. As a result, as shown in FIG. 3 and FIG. 4, the arm 110 is capable of being pivoted into the interior space or outward when the padlock 100 is in an open position.

Figure 5:
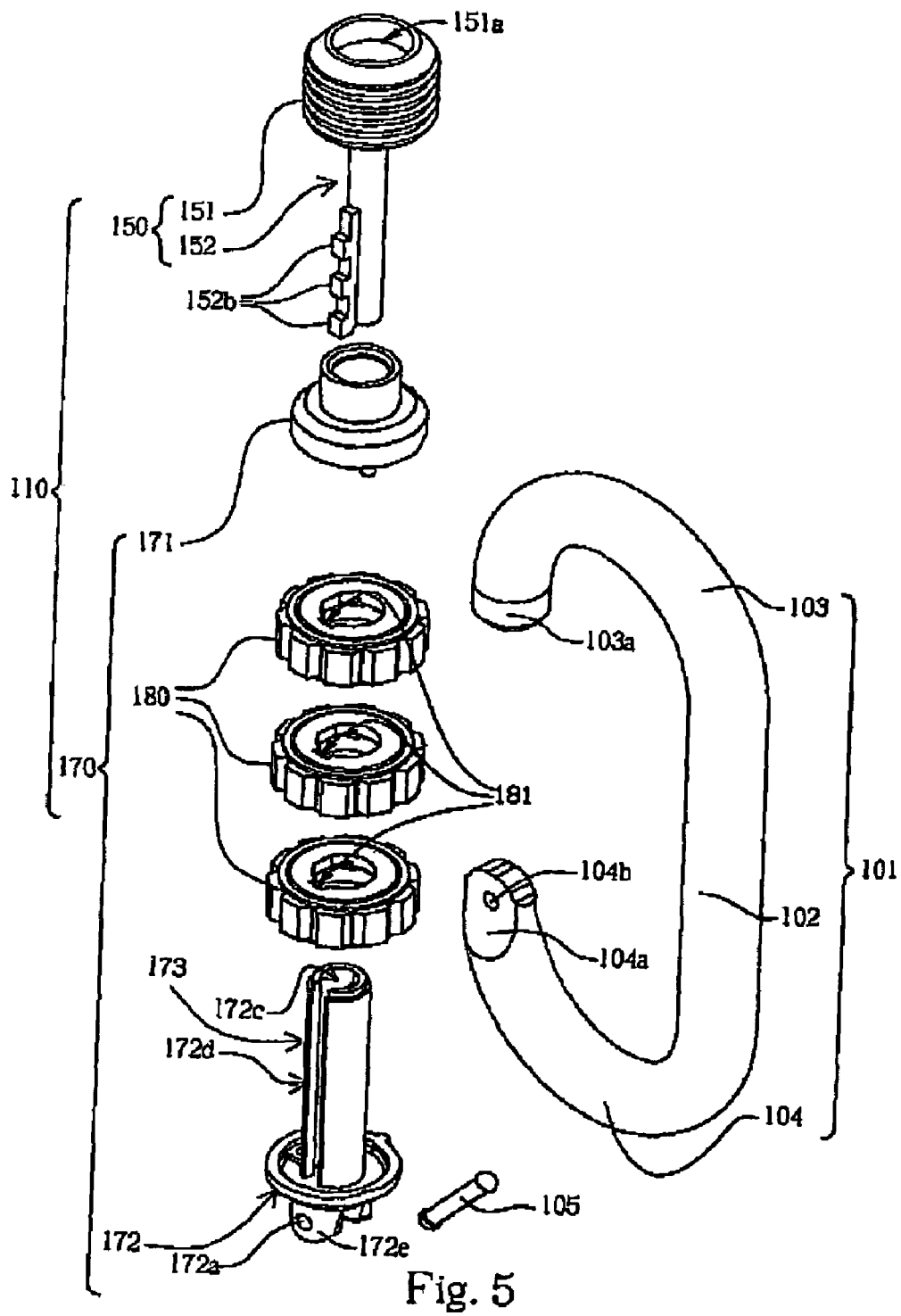
FIG. 5 is an exploded diagram showing the assembly of the padlock according to the present invention.

Please refer to FIG. 5. FIG. 5 is an exploded diagram showing the assembly of the padlock according to the present invention. As shown in FIG. 5, the curved segments 103 and the second 104 include a connective end 103a and a pivotal end 104a, in which the pivotal end 104a also includes an aperture 104b, for connecting the arm 110.

Preferably, the arm 110 includes the movable connection component 150 and a locking mechanism 170, in which the movable connection component 150 further includes a head 151 and a shaft 152. The head 151, the shaft 152 and the first curved segment 103 of the shackle 101 are coaxial. The first curved segment 103 is aligned to the head 151 and the shaft 152. The movable connection component 150 is movable along the axis of the arm 110 toward the locking mechanism 170. The head 151 includes a cylindrical indentation 151a and the surface of the shaft 152 includes a plurality of protrusions 152b thereon. The locking mechanism 170 on the other hand includes a collar 171, an axle 172, and a plurality of tumblers 180, in which the connective end 172e of the axle 172 includes a through hole 172a for connecting axially to the aperture 104b of the pivotal end 104a of the shackle 101. Additionally, the axle 172 includes a central hollow region 172c for accommodating the shaft 152 and allowing the shaft 152 to move axially therein and defines an inner channel 173, which is a portion including the central hollow region 172c and an axial opening 172d. After inserting the shaft 152 into the hollow region 172c, the protrusions 152b are exposed outside the axial opening 172d and tumblers 180 are wrapped around the axle 172. As shown in FIG. 5, each tumbler 180 includes a notch 181. When the locking mechanism 170 is in an unlocked position the notch 181 is aligned with the axial opening 172d thereby allowing the shaft 152 to move axially within the central hollow region 172c of the axle 172. As shown in FIG. 2, when the padlock 100 is in the unlocked position, the head 151 is retracted to detach from the first curved segment 103.

Conversely, when the locking mechanism 170 is in a locked position, notch 181 of the tumbler 180 is not aligned with the axial opening 172d, thereby inhibiting the alignment between the protrusions 152b and the notches 181 and limiting the axial movement of the shaft 152.

Figure 6:
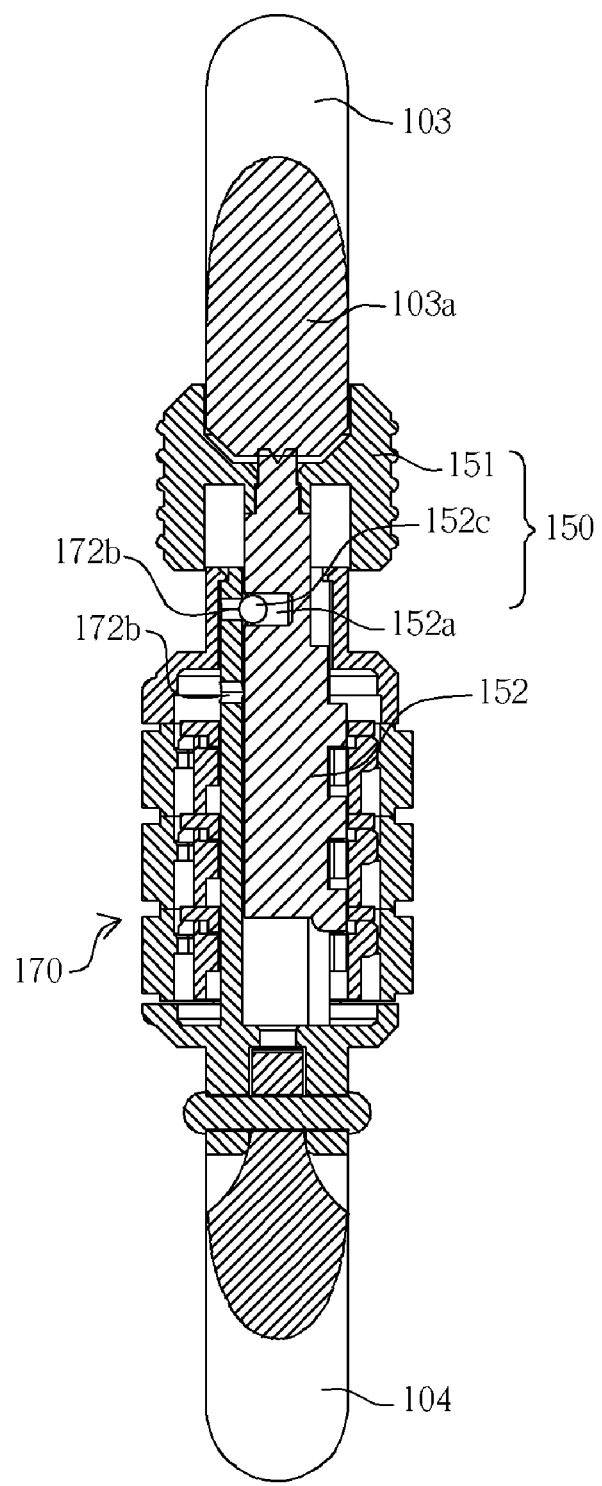
FIG. 6 and FIG. 7 are cross-sectional diagrams showing the on lock and off lock status of the padlock according to the present invention.
Figure 7:
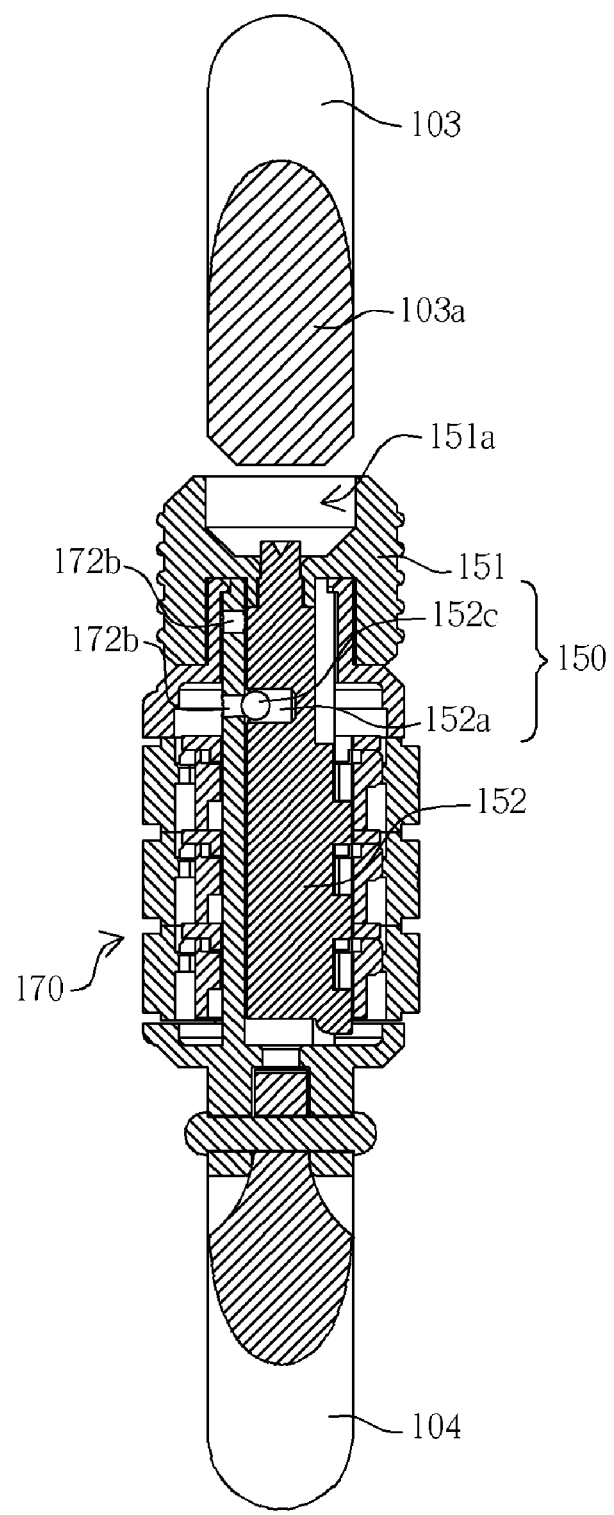

Please refer to FIG. 6 and FIG. 7. FIG. 6 and FIG. 7 are cross-sectional diagrams showing the on lock and off lock status of the padlock according to the present invention. As shown in FIG. 6, when the locking mechanism 170 is in a closed position, the head 151 of the movable connection component 150 is connected to the connective end 103a of the curved segment 103. The shaft 152 is fixed in position within the axle 172 due to the constraint affected on the protrusions 152b by the tumblers 180 of the locking mechanism 170. As shown in FIG. 7, when the locking mechanism 170 is in an open position, the notch 181 of the tumblers 180 will align with the axial opening 172d, thereby causing the shaft 152 to slide within the axle 172. Hence when a user applies a force to the head 151, the movable connection component 150 is free to move downward toward the lower axial direction and cause the head 151 to detach from the connective end 103a. After the head 151 is separated from the connective end 103a, the arm 110 can be pivoted inward or outward by utilizing the pivotal end 104a as an axle center to form a locking device or an opening of a hanger.

Figure 8:
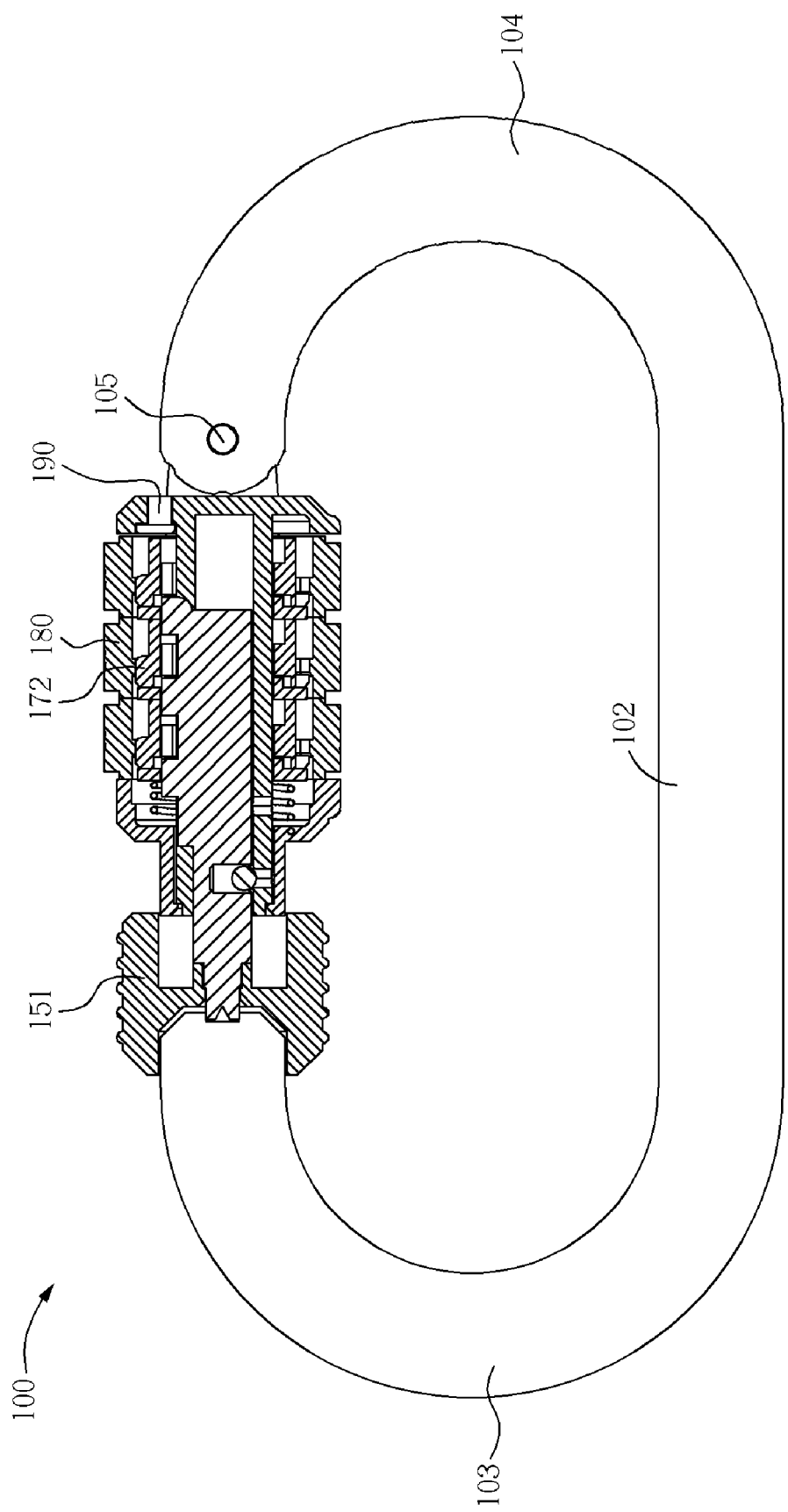
FIG. 8 and FIG. 9 are cross-sectional diagrams showing the means of setting a new combination of the padlock by manipulating a tumbler release according to the present invention.
Figure 9:
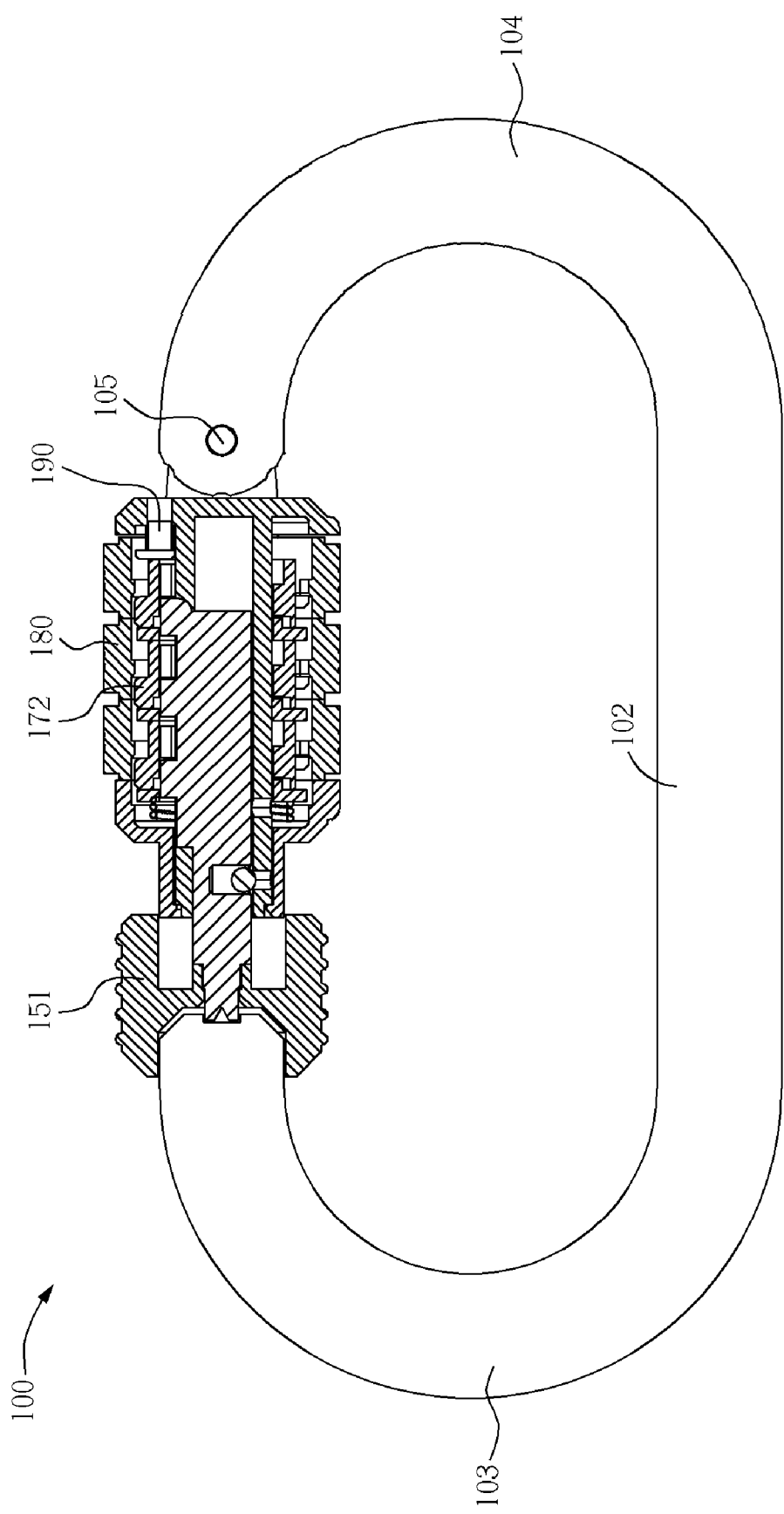

Please refer to FIG. 8 and FIG. 9. FIG. 8 and FIG. 9 are cross-sectional diagrams showing the means of setting a new combination of the padlock by manipulating a tumbler release 190 according to the present invention. As shown in FIG. 8, the padlock 100 includes a tumbler release 190 connected to the axle 172, such that when the tumblers 180 are rotated by the user, the rotation of the tumblers 180 will initiate a rotation of the axle 172 in the same time. In order to change the combination of the padlock 100, the tumblers 180 should be first rotated to a proper position according to the original combination and by rotating the tumblers 180 to the proper position, the tumbler release 190 can be pressed toward the head 151 of the padlock 100. Preferably, when the tumbler release 190 is pressed toward the head 151 of the padlock 100, the axle 172 inside the locking mechanism 170 will move toward the same direction simultaneously and cause the axle 172 to detach from the tumblers 180, as shown in FIG. 9. After the tumblers 180 and the axle 172 are detached from each other, a new combination can be set while still pressing the tumbler release 190. Next, the tumbler release 190 can be released thereby returning the axle 172 back to its original position.

According to another embodiment of the present invention, a hanger can also be formed by removing the locking mechanism 170 while maintaining the shackle 101, the arm 110, and the movable connection component 150. To manipulate the hanger, a slot 152a is formed over the surface of the shaft 152 to contain a fastener 152c and two slots 172b are formed within the axle 172. Preferably, the fastener 152c is further connected to the slot 152a via a spring (not shown), in which the fastener 152c is inserted into either one of the slots 172b to reposition the movable connection component 150 when the movable connection component 150 slides within the axle 172.

In contrast to the conventional padlock, the padlock of the present invention includes a shackle having a connective end and a pivotal end and an arm connected to the pivotal end of the shackle, in which the arm further includes a locking mechanism and a movable connection component. The locking mechanism includes an axle and a plurality of tumblers and the movable connection component includes a head and a shaft connected to the head. Preferably, the head secures the connective end of the shackle when the locking mechanism is in a closed position, and the head is detached from the connective end of the shackle while only the movable connection component is movable along the axis of the arm when the locking mechanism is in an open position, in which the shaft of the movable connection component is able to move axially within the axle while the locking mechanism remains stationary.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A padlock comprising:
   a shackle having a first end and a second end; and
   an arm, the arm being extendable along an axis of the arm, the arm comprising;
      a locking mechanism comprising an axle pivotally connected to the second end, and a plurality of tumblers passed through by the axle, the axle defining an inner channel; and
      a movable connection component having a head and a shaft connected to the head, the shaft passing through the tumblers; wherein the head and the shaft are coaxially movable relative to the first end and the second end, and the first end is aligned to the head and the shaft, and when the locking mechanism is in a locked position, the head is attached to the first end and when the locking mechanism is in an unlocked position, only the movable connection component is movable along the axis of the arm toward the locking mechanism and the head is retracted to detach from the first end.

2. The padlock of claim 1, wherein the axle further comprises an axial opening and each tumbler further comprises at least one notch on an inner wall of each tumbler.

3. The padlock of claim 2, wherein the looking mechanism is in the open position when the at least one notch of the each tumbler is aligned with the axial opening of the axle, and the locking mechanism is in the closed position when are notch of the tumblers is not aligned with the axial opening.

4. The padlock of claim 1 further comprising a collar passed through by the axle of the locking mechanism for fixing the tumblers in position.

5. The padlock of claim 1, wherein the head and the shaft are formed integrally.

6. The padlock of claim 1, wherein the shaft is contained within the inner channel.

* * * * *